Patented May 18, 1948

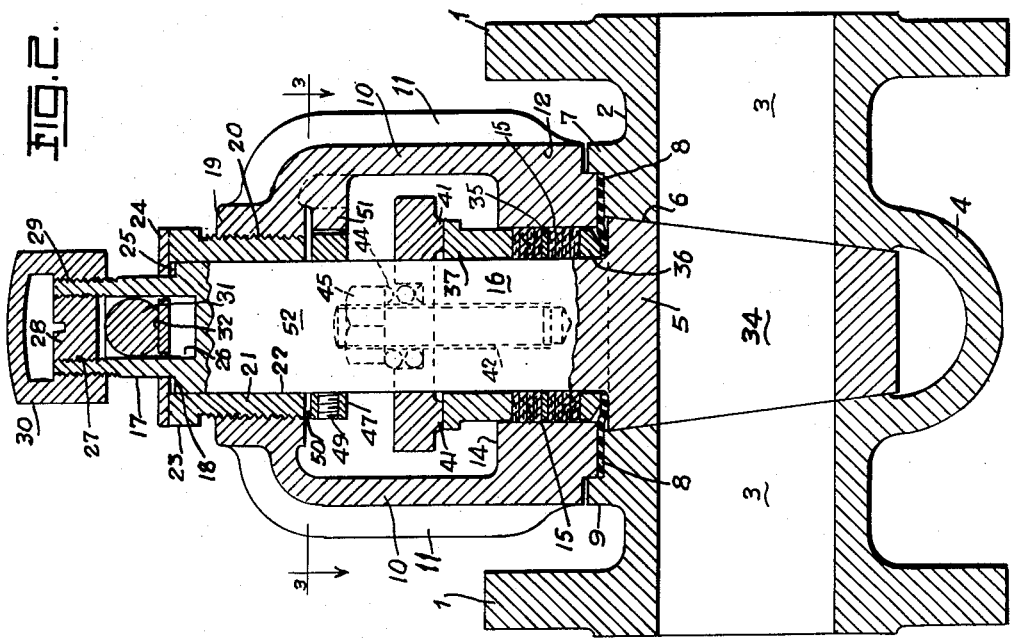
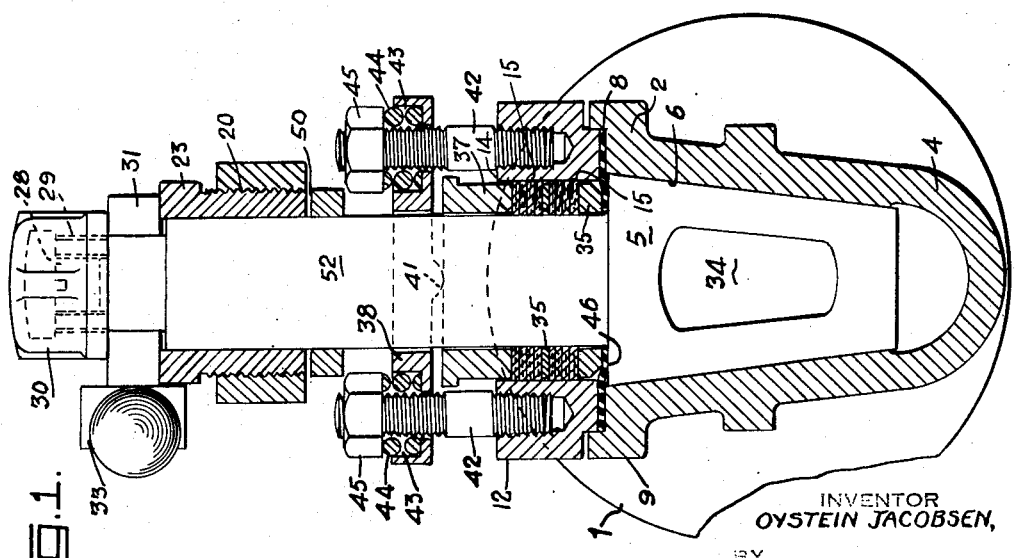

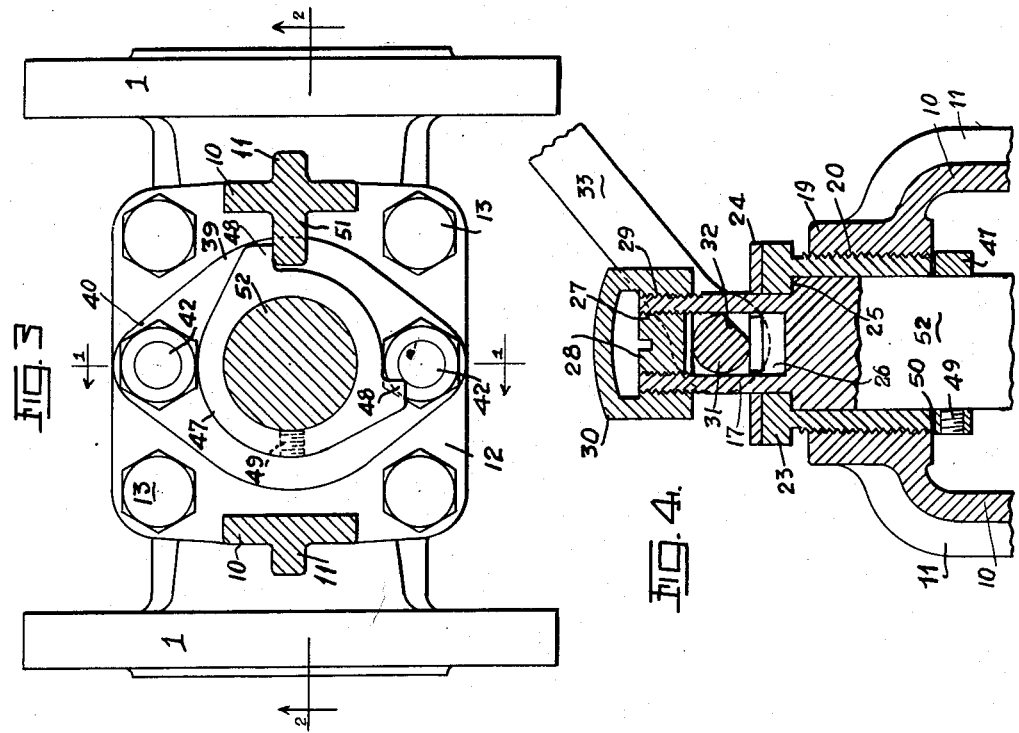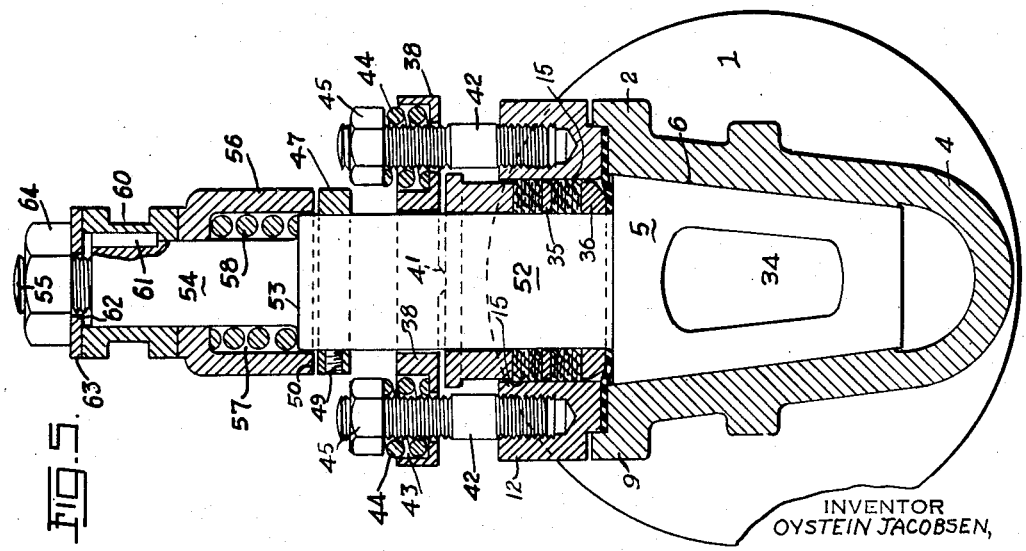

2,441,705

UNITED STATES PATENT OFFICE 2,441,705

PLUG COCK VALVE

Oystein Jacobsen, Montgomery County, Ohio, assignor to The Duriron Company, Inc., Dayton, Ohio, a corporation of Ohio Application March 22, 1944, Serial No. 527,631

6 Claims. (Cl. 251—97)

1

The present invention relates to valves for controlling the flow of liquids and more particularly to those valves of the mechanical lift plug cock type.

The plug cock type of valve has been satisfactory in operation especially in small installations but when such valve is used for the purpose of controlling large quantities of high pressure fluid, thus necessitating rotating parts of considerable weight, difficulty may be encountered in operating the valve. The plug may adhere tenaciously to its seat due to a sticking or galling effect produced by the rubbing of the metallic surfaces; also by acid containing liquids precipitating nitrates or sulphates which will cement the rotating parts.

Many expedients have been proposed to "loosen up" or "unfreeze" the plug valve and for this purpose a heavy grease has been introduced into the lower part of the valve body which, when placed under pressure tends momentarily to lift the plug and simultaneously to lubricate the bearing surfaces. One objection to the use of the lubricant for this purpose is that it is difficult to determine or measure the amount of pressure under which the lubricant must be placed in order to lift the valve under any and all circumstances and this problem is enhanced when there is any leakage or loss of pressure in the lubricant mass.

Another method which has been satisfactorily employed involves the use of a mechanical lift arrangement in which the plug is caused to be elevated by a camming effect introduced at the top of the valve through a lever and under certain circumstances the cam and lever may be replaced by a lifting nut. However, it has been found that where little or no dependence is placed on pressure exercised by a lubricant for the lifting effect and the latter is obtained almost entirely by a mechanical device, some difficulty may be encountered in causing the valve to return to its seat sufficiently quickly to reduce leakage at the valve after the plug has been momentarily lifted in order to return. In accordance with one of my earlier filed applications, there has been proposed the use of a compression spring contained within a cap arranged about the plug stem and so positioned with respect to the stem as to force the valve downwardly

2 into its seat after the lifting effect at the top has been removed. Structure of this character has operated satisfactorily but it has been found in the case of very large valves that this spring may assume a considerable size and therefore require a surrounding cap of comparatively large diameter and bulk. Moreover, even though the spring is protected almost completely from the liquid passing through the valve, and therefore is not ordinarily subject to corrosion, nevertheless, over long periods of time fumes from an acid-containing liquid which may be passing through the valve may reach the spring and through corrosion materially weaken the member even to the point of breakage. When this condition happens, it is usually necessary to dismantle the entire upper portion of the valve structure in order to replace the valve spring which may occur at inconvenient times and involve considerable labor.

The primary object of the invention is to reduce any tendency of the seating spring to break from any cause whatsoever so that the purpose of the invention is to increase the life of the valve as a whole which involves a spring of this character. In carrying out this object, structure is provided by which the compressional stress on the seating spring is reduced and in particular, additional springs located at convenient places on the valve are employed, which serve to share the necessary valve seating force with the centrally disposed main seating spring. These auxiliary springs are preferably carried by the plate which applies pressure to the packing ring gland member so that these auxiliary springs are located at a position where they can be readily inspected and replaced if necessary without taking the entire valve apart.

The invention will be better understood when reference is made to the following description and the accompanying drawings in which:

Figure 1 represents an elevational view but mainly in section taken along line 1—1 in Figure 3. Certain of the machine elements such as the flange bolts and parts of the lifting mechanism are shown in elevation as are also the plug and the valve stem.

Figure 2 is a vertical section taken from a position 90° removed from that shown in Figure 1 and corresponding to the line 2—2 indicated in Figure 3.

Figure 3 shows a transverse sectional view of the valve taken at the approximate position indicated by the line 3—3 in Figure 2.

Figure 4 shows the valve structure at the upper portion of Figure 2 with the lifting mechanism in an elevated position preparatory to turning the valve between its open and closed positions.

Figure 5 is a vertical sectional view with the end valve stem and the lifting mechanism in elevation and showing a different form of lifting structure from that illustrated in Figure 2.

Referring more particularly to Figures 1 to 3, reference character 1 represents the end flange portions of a coupling body 2. An opening 3 preferably of circular configuration extends longitudinally through the body. The latter may be provided with a downwardly extended portion 4 which serves as a sump for the oil or grease normally introduced between the plug valve 5 and its seat 6. The latter may take the form of a vertically positioned opening of conical shape, centrally disposed with respect to the coupling body 2 and therefore communicating with the longitudinal opening 3. The plug 5 has a conical shape and fits snugly but slidably within the conically shaped opening or seat 6.

The upper part of the body 2 is provided with a flat shouldered portion 7 and there is a gasket 8 fitted against the shoulder to prevent leakage. The shouldered portion 8 merges into a relatively large rectangularly shaped member 9 which extends flatwise across the upper surface of the valve body as can be seen in Figure 3.

Resting on the gasket 8 there is a relatively heavy bonnet member 10 provided with upstanding ribs 11 and terminating at the bottom in a rectangularly shaped metal plate 12 (Fig. 3) of approximately the same size as the plate 9. Four bolts 13 may be provided at the corner of the plates 9, 12 in order to secure these members together. The bonnet 11 is provided at the lower end with an annular portion 14 which has a central vertically disposed opening 15 extending to the bottom of the bonnet. This opening slidably receives an upstanding shaft 16 preferably formed integral with the plug 5 and having at its upper end a cylindrical extension 17 of smaller diameter which leaves a shoulder 18. The bonnet 10 terminates at the upper end in a cylindrical portion 19 provided with a centrally disposed threaded opening 20 for receiving the threads of a bushing 21 which is interposed between the ring 19 and the valve stem 16. For the purpose of receiving the valve stem, the bushing 21 is provided with a round opening 22 preferably ground to give a snug but sliding fit with respect to the valve stem. The bushing 21 terminates at the top in a flanged portion 23 on which rests a steel washer 24 just above the shoulder 18 but leaving a space indicated at 25 between the shoulder and the under surface of the washer. The extension 17 is provided with a slot 26 which extends laterally of the portion 17 and merges with arcuately shaped threaded surfaces 27 for receiving a headless screw 28. The outer surface of the extension 17 is also threaded as indicated at 29 for receiving a large cap nut 30 so that when the outer and interior nuts are threaded in position the upstanding portions 17 are firmly held from moving both inwardly and outwardly to effect a rigid structure.

There is a rod 31 having a diameter substantially the same as the width of the slot 26 and positioned within the opening formed by the slot 26 at each side and by the upper surface of the washer 24 at the bottom and lower surface of the screws 28 at the top. Actually, the rod 31 contacts the lower surface of the cap nut 30 and at the bottom is provided with a flat camming surface 32 which rests on and bears against the upper surface of the washer 24. A lever 33 is secured to one end of the rod 31 so as to permit the rotation thereof. It is obvious that as the lever is moved for example counterclockwise to the position shown in Figure 4, this action has the effect of elevating the central axis of the rod due to the fact that the round surface of the rod now contacts with the washer so that the upper surface of the rod exerts pressure against the nut 30 to thereby raise the valve stem 16. This causes the plug valve 5 to be elevated from its seat 6 and thus break the seal or loosen the joint at its seat and thereby permit the valve to be turned between its valve-open and valve-closed position. The plug 5 is provided with a transversely extending opening 34 of roughly a trapezoidal configuration and is so positioned that when the plug is in the valve open position, the opening 34 is in line with the opening 3 of the valve body but when the plug 5 has been turned approximately 90°, the obstructed portions of the plug are presented to the openings 3 to close off the valve. Thus, the plug 5 can be rotated from the valve-open to the valve-closed position and vice versa by first lifting the lever 33 upwardly to break the joint at the valve seat and then rotating the valve stem through the necessary angular distance after which the lever 33 is lowered and the plug is permitted to enter its seat.

The ordinary form of packing structure, for example a divided system of packing washers indicated at 35, is provided between the opening 15 in the bonnet and the valve stem 16, this packing structure being supported on a metal washer 36 which bears against the innermost annular portion of the gasket 8. A gland 37 formed of a metal cylinder is positioned in the annual space between the opening 15 and the valve stem, thus resting on the packing washers and pressure may be applied to the gland 37 by means of a plate 38 provided with a circular portion indicated at 39 (Figure 3) and two wing portions 40. A pair of projections 41 depend downwardly from diametrically opposed positions on the lower surface of the plate to bear against the cylindrical gland 37. Openings are provided in the wing portions 40 to receive a pair of bolts 42 which extend loosely through the openings but are threaded at the bottom into the circular portion 14 of the bonnet member. The plate 38 is provided with a pair of countersunk openings 43 in the wing portions at the positions of the bolts 42 and these openings receive a pair of compression springs 44 which are held in position by means of nuts 45 threaded on the bolts 42.

It is apparent that as the nuts 45 are tightened, pressure is exerted on the packing gland at the projections 41. When the lever 33 is elevated as shown in Figure 4, so as to lift the plug 5 and the stem 16 in the manner explained hereinbefore the shoulder 46 of the plug valve will press upwardly through the packing and the gland member 37 to effect an upward movement of the plate 38 against the compression springs 44. After the lever 33 has been rotated in the horizontal direction and then lowered so as to permit the flat surface 32 of the rod 31 to rest on the washer 24, the springs 44 will immediately force the plug 5 back into its seat. A stop may be provided for allowing only a limited rotary movement of the plug 5 from valve-open to valve-closed position and vice versa, this stop conveniently taking the form of a ring 47 having a pair of outwardly extending projections 48 positioned approximately 90° apart and secured to the upper portion of the stem by means of a set screw 49, directly below the bushing 21. A sufficient space 50 obviously must be left between the upper surface of the ring 47 and the lower surface of the bushing to permit the stem and the ring to move upwardly when the lever 33 is elevated. A projection 51 extends inwardly from the inner surface of the bonnet 10 directly opposite from the ring so that the adjacent inner surfaces of the projections 48 may contact the projection 51 and thus limit the rotary movement of the valve stem.

It is therefore apparent that the springs 44 serve the important function of immediately seating the valve 5 after the stem 16 had been previously elevated to break the seal of the valve seat and the valve had been moved from valve-open to valve-closed position or vice versa between the limits determined by the projections 48. The advantage of providing the seating springs 44 on the plate 38 instead of around the valve stem as in prior constructions is that it is a very simple matter to remove the springs for inspection and to replace the same, thus assuring continuous and reliable operation of the valve. This inspection and replacement operation calls merely for the removal of the nuts 45 which are positioned in readily accessible places. Moreover, by providing a plurality of springs instead of the usual centrally disposed seating spring the failure of one spring will not affect the other spring so that it may and usually does cost only one-half the expenditure of replacing the centrally disposed spring. If desired, more than two springs may be provided about the plate 38 so that the cost of replacement of any one spring is decreased even more proportionately. These springs are removed from the valve stem 16 by a considerable distance and therefore are not subject to the corrosive action of fumes which may get past the packing member 15 and travel upwardly along the stem. However, immediately upon lowering of the lever 33 the plate 38 snaps downwardly into position to resume its pressure against the gland member 37.

While the springs 44 shown in Figure 1 may exercise all of the force that is necessary to seat the plug 5, I may if desired, employ such springs in combination with a centrally disposed spring which operates directly against a shoulder formed on the valve stem. This modification is shown in Figure 5 in connection with a so-called "screw" form of value lifting mechanism. That part of the valve structure shown below the plate 38 is exactly the same in Figure 5 as was explained in connection with Figure 1. However, in Figure 5 the valve stem 52 is provided with a shoulder 53 to leave a stem portion 54 of smaller diameter and the latter terminates in a threaded extension 55. There is a hollow cap member 56 which fits slidably about the stem portion 54 and is provided with an internal chamber 57 which contains a compression spring 58 immediately surrounding the stem portion 54. This cap member forms the upper portion of a bonnet 10 as was explained in connection with Figure 2 but is not shown in Figure 5 due to the angle at which the cross-sectional view has been taken. It will be understood that the lower part of the bonnet terminates in a heavy flat plate member 14 which receives the threaded shanks of the bolts 42.

There is a ring 47 similar to that explained in connection with Figure 3 for limiting the rotary movement of the stem 52 when rotated in a manner which will be described hereinafter. Resting upon the upper surface of the cap member 56 there is a circular turn nut 60 keyed to the stem as indicated at 61 but permits the stem to slide longitudinally through the nut when the valve is being elevated to break the seal at the valve seat. The shoulder 62 formed by the threaded end portion 55 is positioned below the upper surface of the nut 60 and there is a washer 63 supported on top of the nut 60 with a hexagon nut 64 bearing against the washer and engaging the threads on the extension 55. It is obvious that as the nut 64 is tightened, the stem portion 54 is caused to be moved upwardly thus breaking the joint between the plug 5 and its seat 6. While in this elevated position the turn nut 60 is caused to rotate by a suitably shaped wrench (not shown) which operates through the key 61 to turn the valve stem between the valve-open and valve-closed positions. When the plug 5 has reached its new position, the nut 64 is loosened.

It will be noted that when the nut 64 was tightened to elevate the valve stem the spring 58 was put under compression due to the fact that the effective distance between the lower surface of the nut 64 and the shoulder 53 is reduced. Moreover, the shoulder 46 on the valve plug 52 has raised the plate 38 upwardly as in the case of Figures 1, 2 and 4 so that the springs 44 are also placed under compression. Therefore, when the nut 64 is loosened at the end of the valve turning operation all of the springs 58 and 44 cause a downward push on the valve stem and an immediate seating of the valve. The advantages of providing two sets of springs, namely the centrally disposed spring 58 and the smaller springs 44 over a single centrally disposed spring for seating the valve after the rotating operation are that the downward position given to the valve stem is much stronger than could be obtained from a single spring and also should any one of these springs be broken or become ineffective the remaining springs would exercise sufficient force immediately to seat the valve. The modification shown in Figure 5 offers the same advantages that were explained in connection with the structure shown in Figures 1 to 4. If no greater downward thrust is required by reason of the centrally disposed and the laterally positioned springs than that obtained in the structure shown in Figures 1 to 4, it is obvious that each of the springs shown in Figure 5 may be reduced in size and strength and still obtain the normal downward thrust on the valve stem. This in turn assures greater life to the various springs.

From the foregoing it is evident that I have disclosed various ways by which the stem of a plug valve can be immediately seated after being lifted preparatory to a valve turning operation. Inasmuch as the compression members which seat the valve are for the most part provided on the plate 38, any number of such members which conveniently may take the form of springs can be employed and thus relieve the centrally disposed spring 58 either partially or entirely of the function of seating the valve. The operation of the springs 44 can be readily observed from the exterior of the valve to determine whether or not they are properly functioning and also to appraise their operating condition, desirability of replacement, etc. There is no opportunity for these springs to get out of position because they are securely locked in their respective compartments formed by the countersunk openings 43 and the nuts 45.

It will be understood that I desire to comprehend within my invention such modifications as come within the scope of the claims and the invention.

Having thus fully described my invention, what I claim as new and desire to secure by Letters Patent is:

1. A valve for controlling the flow of fluid through a coupling, said coupling being provided with a main passageway and an angularly positioned bore communicating therewith, a plug within said bore adapted to rotate and terminating in a stem and being constructed to provide a surface for the application of axially directed force thereto, a passageway extending laterally through said plug and adapted to register with the coupling passageway when the plug is rotated, a bonnet positioned about said stem having a base portion providing a space of uniform cross section with said stem, packing in said space and cooperating with said surface, a gland member contacting said packing, a gland plate for applying pressure to said gland, spring means resting on said plate for applying pressure through said packing to said plug for urging the plug against its seat, and means for lifting the plug away from its seat against the force of said spring means acting through the packing, said packing moving with said stem to minimize increased compression of said packing.

2. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, a stem connected to said plug having a shouldered portion, a bonnet surrounding said stem and spring means contained within said bonnet and pressing against the shoulder of the stem for urging the plug into its seat, said bonnet being provided with a base portion which surrounds the stem, a plate positioned above said base portion but adapted to move longitudinally of the stem and with respect to said portion, a plurality of springs resting on said plate for flexibly maintaining the plate in position, and means whereby the pressure exerted by said last-mentioned springs is communicated to said plug in order to assist the first-mentioned spring in urging the plug into its seat.

3. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, a stem connected to said plug having a shouldered portion, a bonnet surrounding said stem and spring means contained within said bonnet and pressing against the shoulder of the stem for urging the plug into its seat, said bonnet being provided with a base portion which surrounds the stem, a plate positioned above said base portion but adapted to move longitudinally of the stem and with respect to said portion, a plurality of springs resting on said plate for flexibly maintaining the plate in position, and means whereby the pressure exerted by said last-mentioned springs is communicated to said plug in order to assist the first-mentioned spring in urging the plug into its seat, and means for lifting the plug away from its seat against the urge of all of said springs preparatory to rotating the valve between its valve open and valve closed positions.

4. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, said plug being provided with an upstanding multi-shouldered stem and contained within a bonnet, said bonnet being of sufficient size to leave an annular recess between the bonnet and one of the shouldered portions of the shaft, a compression spring in said recess adapted to bear at one end against one of the shoulders of the shaft and at the other end against said bonnet in order to urge the plug into its seat, means including a plurality of springs disposed about said stem and applying pressure to another shoulder on said stem for assisting the first-mentioned compression spring in urging the plug into its seat.

5. A valve for controlling the flow of fluid through a coupling, said coupling being provided with a main passageway and an angularly positioned bore communicating therewith, a plug within said bore adapted to rotate, a passageway extending laterally through said plug and adapted to register with the coupling passageway when the plug is rotated, said plug being provided with an upstanding multi-shouldered stem and contained within a bonnet, said bonnet being of sufficient size to leave an annular recess between the bonnet and one of the shouldered portions of the shaft, a compression spring in said recess adapted to bear at one end against one of the shoulders of the shaft and at the other end against said bonnet in order to urge the plug into its seat, means including a plurality of springs disposed about said stem and applying pressure to another shoulder on said stem for assisting the first-mentioned compression spring in urging the plug into its seat, and means for lifting the plug away from its seat against the urge of all of said springs preparatory to rotating the plug between said valve open and valve closed positions.

6. A valve for controlling the flow of fluid through a coupling, said coupling being provided with a main passageway and an angularly positioned bore communicating therewith, a plug within said bore adapted to rotate and a stem for said plug, said plug being constructed to provide a surface for the application of axially directed force thereto, a bonnet positioned about said stem having a base portion providing a space of uniform cross section with said stem, packing in said space and cooperating with said surface, and means including a plate for applying pressure through said packing to one end of said plug, a plurality of springs resting on said plug and positioned on opposite sides of said stem for maintaining the plug in its seat, and means for temporarily lifting the plug away from said seat against the force of said springs acting through said packing, said packing moving with said stem to minimize increased compression of said packing.

OYSTEIN JACOBSEN.

REFERENCES CITED

The following references are of record in the file of this patent:

UNITED STATES PATENTS

| Number | Name | Date |
|---|---|---|
| 567,584 | Dewrance | Sept. 15, 1896 |
| 941,024 | Mantius | Nov. 23, 1909 |
| 2,005,128 | Bowes | June 18, 1935 |
| 2,009,358 | Fennema | July 23, 1935 |
| 2,048,385 | Jacobsen | July 21, 1936 |
| 2,142,795 | McFarlane | Jan. 3, 1939 |

FOREIGN PATENTS

| Number | Country | Date |
|---|---|---|
| 683,662 | Germany | Nov. 11, 1939 |